United States Patent Office 2,733,815
Patented Feb. 7, 1956

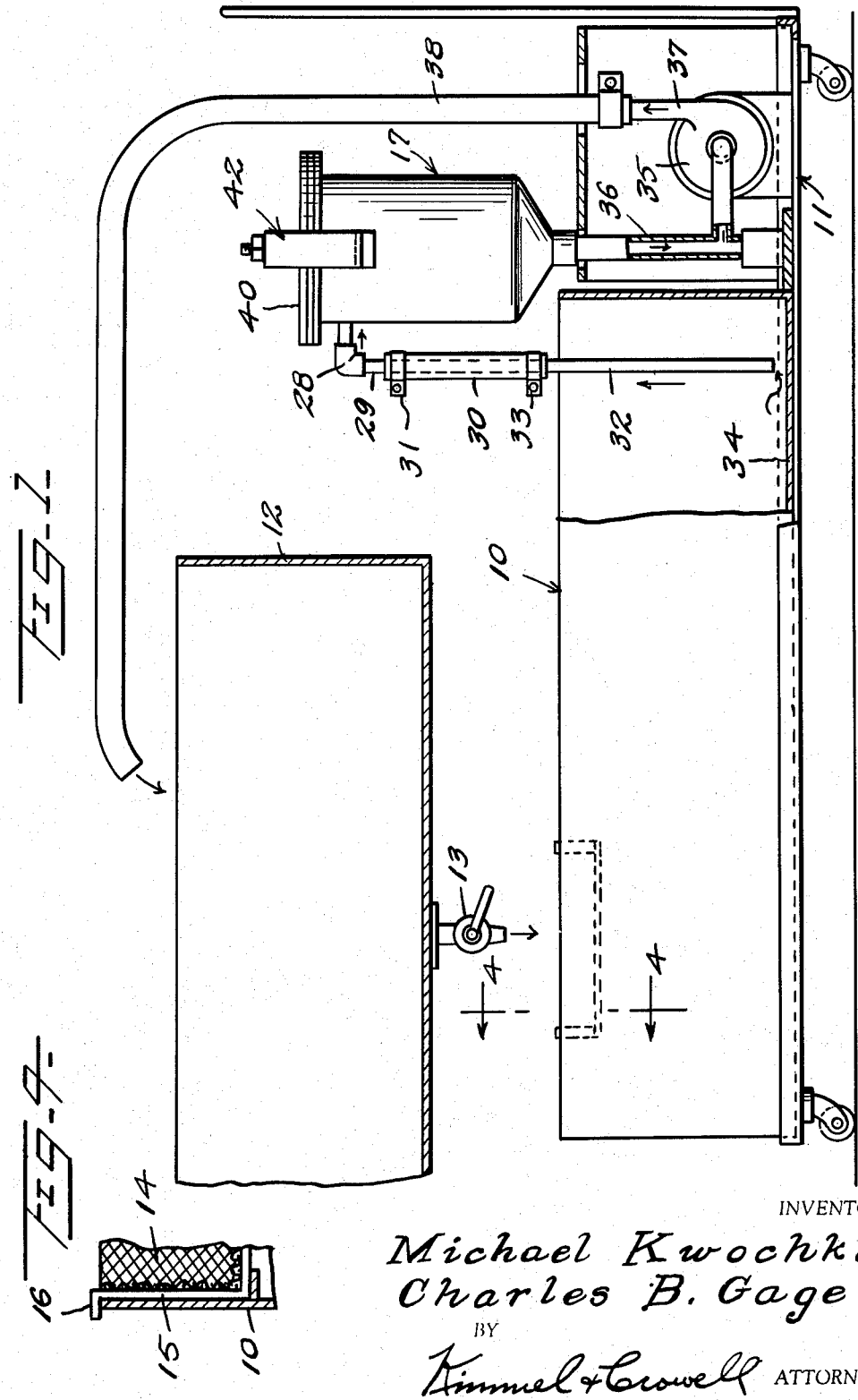

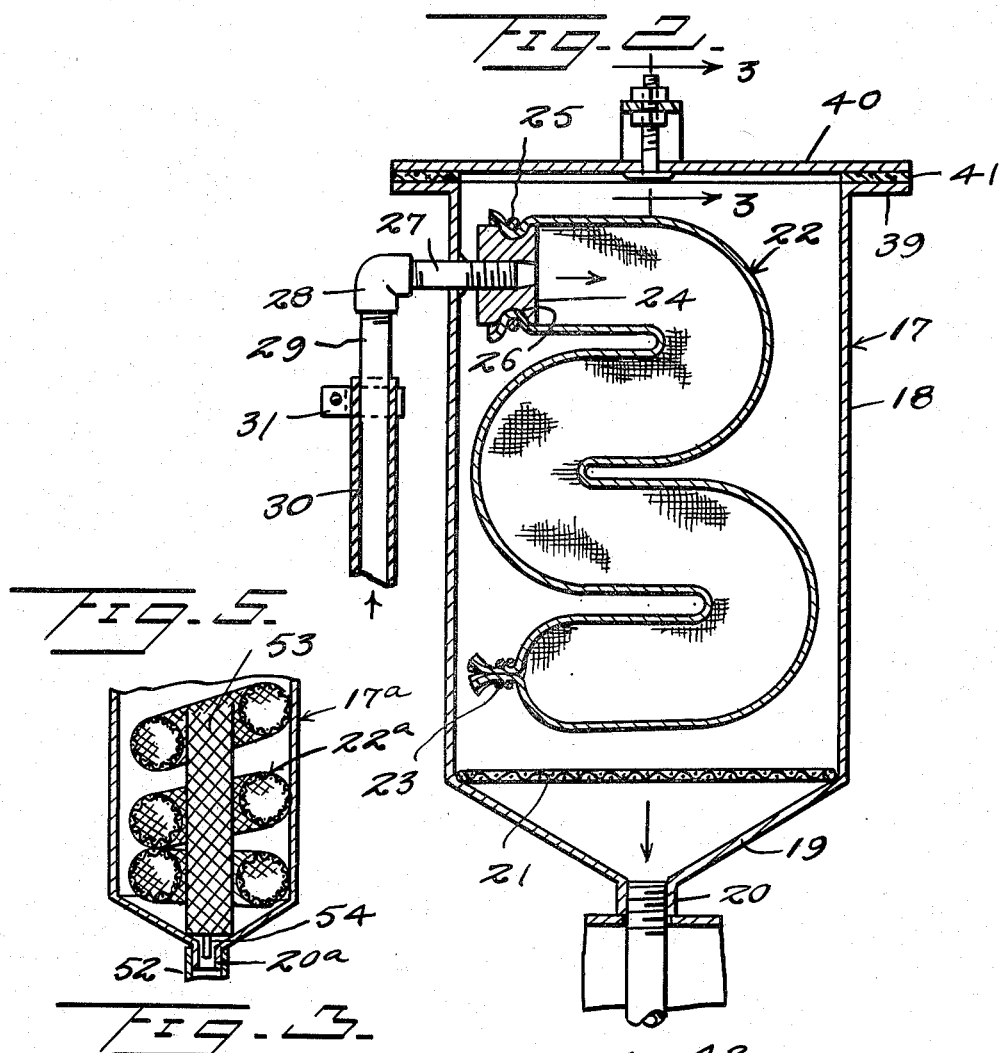
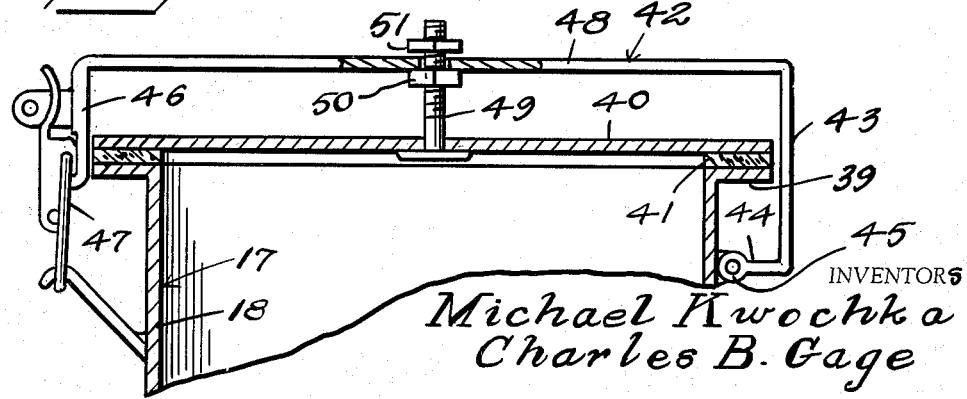

2,733,815

FILTER

Michael Kwochka, Mountain Top, and Charles B. Gage, Wilkes-Barre, Pa.

Application April 14, 1952, Serial No. 282,198

1 Claim. (Cl. 210—164)

This invention relates to oil filters.

An object of this invention is to provide a filter and system associated therewith, whereby oils or greases, such as are used in cooking of food products, may be filtered in order that the oil or grease may be reused.

Another object of this invention is to provide an improved filter structure embodying a tubular fabric through which the oil is drawn, the fabric having an end closed by a removable fastening means so that the interior of the filtering element may be readily cleaned.

A further object of this invention is to provide an improved filter means embodying a cylindrical casing with a cap on the upper end thereof, and an improved means for removably clamping the cap onto the casing.

With the above and other objects in view, my invention consists in the arrangement, combination and details of construction disclosed in the drawings and specification, and then more particularly pointed out in the appended claim.

In the drawings:

Figure 1 is a fragmentary side elevation partly broken away and in section of a filtering system embodying a filter means constructed according to this invention.

Figure 2 is a vertical sectional view of the filter unit.

Figure 3 is a fragmentary sectional view taken on the line 3—3 of Figure 2.

Figure 4 is a fragmentary sectional view taken on the line 4—4 of Figure 1.

Figure 5 is a fragmentary vertical section of a modified form of filter unit.

Referring to the drawings, the numeral 10 designates generally a receiver which is open at the top and is mounted on a mobile frame 11. A receptacle 12, which is adapted to contain hot greases or oils, is disposed above or remote from the receiver 10; and the receptacle 12 is designed for use in cooking food products in deep fat or the like.

The receptacle 12 has a valve 13 connected with the bottom wall which is adapted to discharge the hot fats or oils into the receiver 10. A basket-like screen 14 is disposed in the receiver 10 below the valve 13 and is removably mounted on a supporting frame 15, having out-turned flanges 16 engaging over the upper edge of the receiver 10. The screen or strainer 14 is designed for use in initially separating the larger food particles in the hot oils or fats and the smaller food particles are adapted to be removed from the oils or fats as will be hereinafter described.

A filter unit generally designated as 17 is disposed at one end of the receiver 10 and embodies a cylindrical casing 18, having a cone-shaped bottom 19 terminating in an interiorly threaded nipple 20. A disc-shaped screen 21 is disposed in the lower portion of the casing 18 and is adapted to strain any food particles which pass through the filter element, generally designated as 22.

The filter element 22 is constructed in the form of an elongated tubular fabric which is closed at its lower end by means of a string or fastening device 23. The upper end of the filter element 22 is secured on a block or nut 24 by means of a split clamping ring 25. The block or nut 24 is formed with an annular groove 26, within which the upper end of the filter element 22 is secured by the clamping ring 25.

The nut or block 24 is threadably mounted on a nipple 27 which extends through the side wall 18 of the casing 17, and nipple 27 has secured to its outer end, an L 28. A short nipple 29 extends downwardly from the L 28 and a flexible tube 30 is clamped by clamping means 31 to the nipple 29. A pipe 32 is secured to the lower end of the flexible member 30 by a clamping band 33, and the lower end of pipe 32 is disposed closely adjacent the bottom wall 34.

A suction pump 35 is mounted on the carrier or frame 11, and the inlet side of the pump 35 is connected by means of a pipe 36 to the outlet nipple 20 of casing 17. The pump 35 has an outlet 37 connected by means of a flexible hose 38 to the receptable 12, the discharge end of hose or tubular member 38 being positioned over the top of the receptacle 12.

The casing 17 is formed at its upper end with an annular flange 39, and a cap or closure 40 engages over the upper end of casing 17 with a gasket 41 interposed between the cap or closure 40 and the flange 39. The closure 40 is secured on the casing 17 by means of a U-shaped clamping bar 42, which extends above the closure 40 and has a leg 43 formed with an inturned extension 44 hingedly secured, as at 45, to the side wall 18 of casing 17.

The clamping member 42 also includes a depending side 46 with which a pressure latch 47 is adapted to be engaged for securing the clamp 42 over the casing 17. The bight 48 of clamping member 42 is secured to the closure 40 by means of a bolt 49, which is fixed to the closure 40 and is adjustably secured to the bight 48 by adjustable nuts 50 and 51.

Referring now to Figure 5, the casing 17a is formed similar to casing 17 with the exception that the nipple 20a is disposed interiorly of the outlet pipe 52. A tubular screen 53 is disposed centrally of the casing 17a and is provided with legs 54 projecting partly into the nipple 20a. The tubular filter element 22a, in the present instance, is extended in spiral form about the central screen 53 so that there will be a relatively large screening area presented to the filter element 22a, and it will, of course, be understood that the central tubular screen or strainer 53a will also partially support the filter element 22a and keep the latter from collapsing into the bottom of the casing 17a.

In the use and operation of this device when it is desired to clean or filter the fats or oils, the liquid is discharged into the receiver 10 by opening valve 13 and at this time, the strainer 14 is positioned below the valve 13. Pump 35 is operated so as to pull the liquid through the casing 17 and through the tubular filter element 22.

When the pump is operating, tubular filter element 22 will be expanded, as shown in Figure 2, and the liquid will be drawn through the fabric of the filter element and any small particles will be retained within the element 22. Element 22 may be cleaned by removing fastening means 23 so that the liquid may freely flow through the element or this element may be removed from the casing 17 and cleaned in any suitable manner. By having a tubular filter element 22 as hereinbefore described, this element may be easily and quickly replaced by a clean element. The partial vacuum created in the casing 17 also serves to hold the closure 40 tightly on the open end of the casing.

I do not mean to confine myself to the exact details of construction disclosed therein, but claim all variations falling within the purview of the appended claim.

What we claim is:

A filter unit comprising a cylindrical casing having an open upper end, a closure member loosely extending across said upper end of said casing, means pivotally securing said closure member on said casing, said means comprising a substantially inverted U-shaped bar having an arm thereof pivotally connected on said casing adjacent said upper end and the bight portion of said bar extending diametrically across said closure member in vertically spaced relation, means releasably locking the other end of said bar to said casing, said closure member having an opening extending transversely therethrough and positioned below said bight portion, a bolt extending through said opening and secured to said closure member with the head of said bolt engaging the lowermost side of said closure member, means securing said bolt to said bight portion of said bar, a conical bottom formed integrally with said casing, an outlet member extending from the lower end of said conical bottom for connection with the suction side of a pump, said suction created by said pump serving to hold said closure member on said open end of said casing, a disc-shaped scraper member seated on the upper large end of said conical bottom, an intake nipple extending through the side of the upper end of said casing, said nipple being externally threaded at each end, a nut threaded on the inner end of said nipple, a pair of spaced apart annular shoulders formed on the outer surface of said nut, an expansible flexible open ended tubular frabric filter member in said casing, means engaging over one end of said filter member and between said annular shoulders on said nut for securing one end of said filter member to said nut, and removable means closing the other end of said filter member, said filter member being convoluted within said casing.

References Cited in the file of this patent

UNITED STATES PATENTS

| | | |
|---|---|---|
| 972,281 | Stamets | Oct. 11, 1910 |
| 1,597,021 | Diratzouian | Aug. 24, 1926 |
| 2,425,848 | Vawter | Aug. 19, 1947 |
| 2,551,312 | Bokich | May 1, 1951 |
| 2,608,301 | Graves et al. | Aug. 26, 1952 |
| 2,610,740 | Hunter | Sept. 16, 1952 |
| 2,647,639 | Grein | Aug. 4, 1953 |

FOREIGN PATENTS

| | | |
|---|---|---|
| 2,799 | Switzerland | Nov. 4, 1890 |
| 234,151 | France | Nov. 18, 1893 |
| 10,960 | Switzerland | Dec. 11, 1895 |